(12) United States Patent
Masuda et al.

(10) Patent No.: US 6,861,471 B2
(45) Date of Patent: Mar. 1, 2005

(54) COATING COMPOSITION FOR POLYOLEFIN RESIN AND PROCESS FOR PRODUCING THE SAME

(75) Inventors: Takafumi Masuda, Takasago (JP); Shoji Maekawa, Takasago (JP); Shigeru Sugiyama, Osaka (JP); Shin-ichi Akiyama, Osaka (JP)

(73) Assignee: Toyo Kasei Kogyo Company Limited, Osaka (JP)

( * ) Notice: Subject to any disclaimer, the term of this patent is extended or adjusted under 35 U.S.C. 154(b) by 0 days.

(21) Appl. No.: 10/474,356

(22) PCT Filed: Apr. 10, 2002

(86) PCT No.: PCT/JP02/03564

§ 371 (c)(1),
(2), (4) Date: Oct. 7, 2003

(87) PCT Pub. No.: WO02/083772

PCT Pub. Date: Oct. 24, 2002

(65) Prior Publication Data

US 2004/0147684 A1 Jul. 29, 2004

(30) Foreign Application Priority Data

Apr. 11, 2001 (JP) ........................................ 2001-112485

(51) Int. Cl.$^7$ ........................ C08F 290/00; C08L 51/06
(52) U.S. Cl. ........................ 525/64; 525/69; 525/322; 525/359.1; 525/285; 525/301; 524/501
(58) Field of Search ........................ 525/64, 69, 322, 525/359.1, 285, 301; 524/501

(56) References Cited

FOREIGN PATENT DOCUMENTS

| JP | 61-200112 A | | 9/1986 | |
|---|---|---|---|---|
| JP | 1-16414 B2 | | 3/1989 | |
| JP | 2-124986 A | | 5/1990 | |
| JP | 3-60872 B2 | | 9/1991 | |
| JP | 4-4272 A | | 1/1992 | |
| JP | 5-9428 A | | 1/1993 | |
| JP | 6-2771 B2 | | 1/1994 | |
| JP | 8-59757 A | | 3/1996 | |
| JP | 08058767 | * | 3/1996 | ......... C08F/290/00 |
| JP | 9-143422 A | | 6/1997 | |
| JP | 11-189742 A | | 7/1999 | |
| JP | 2000-7979 A | | 1/2000 | |

* cited by examiner

Primary Examiner—James J. Seidleck
Assistant Examiner—Olga Asinovsky
(74) Attorney, Agent, or Firm—Kubovcik & Kubovcik

(57) ABSTRACT

The present invention provides a coating composition for polyolefin resins, comprising a resin obtained by graft-copolymerizing at least one member selected from the group consisting of an α,β-unsaturated carboxylic acid and an acid anhydride thereof with at least one member selected from the group consisting of polypropylene and a propylene-α-olefin copolymer, chlorinating the graft copolymer to give an acid-modified chlorinated polyolefin, linking a (meth) acrylic ester having one hydroxyl group to the polyolefin via an ester linkage, and then graft-copolymerizing (meth) acrylic acid monomers with the polyolefin; and a process for producing the composition.

17 Claims, No Drawings

US 6,861,471 B2

COATING COMPOSITION FOR POLYOLEFIN RESIN AND PROCESS FOR PRODUCING THE SAME

TECHNICAL FIELD

The present invention relates to a coating composition having excellent adhesion to polyolefin resins, such as polypropylene, and a process for producing the same.

BACKGROUND ART

Polyolefin resins, such as polypropylene, are being increasingly used in automotive parts and the like because of their high-performance and cost-saving benefits. However, unlike polar synthetic resins, such as polyurethane, polyamide, acrylic or polyester resins, polyolefin resins are non-polar and also crystalline, and thus cause difficulties in coating or bonding applications.

A conventional approach to solving the above problem involves activating the surfaces of polyolefin resin molded articles by plasma or gas flame treatment to thereby promote the adhesive properties of the molded articles. However, this approach has drawbacks, such as the necessity of complicated processes, which imposes a huge burden on facility costs and time, as well as possible variations in surface treatment effect owing to the shape complexity of the molded articles or the influence of pigments or other additives.

Various methods as approaches to applying polyolefin resins without such surface treatments (pretreatment) have been proposed which utilize a primer composition, such as that used in the coating of car bumpers made of polypropylene (e.g., Japanese Examined Patent Publication No. 1994-002771).

Such a primer composition generally contains, as a main component, a chlorinated polyolefin resin formed by modifying a polyolefin with an unsaturated carboxylic acid and/or an acid anhydride thereof and then chlorinating the modified polyolefin (e.g., Japanese Examined Patent Publication No. 1989-016414). Japanese Examined Patent Publication No. 1991-060872 discloses that, by graft-copolymerizing a radical polymerizable unsaturated compound with chlorinated polypropylene and liquid rubber, a binder is obtained that adheres to polyolefin resins as well as other polar resins.

However, these chlorinated polyolefin resin compositions are less compatible with resins contained in primer compositions or topcoat materials such as acrylic resins, polyester resins or polyurethane resins, and therefore cause difficulties in forming a uniform film. In addition, modified products using liquid rubber may produce a tacky coating film, thus failing to sufficiently improve compatibility and solution stability.

DISCLOSURE OF THE INVENTION

An object of the present invention is to provide a coating composition which has excellent adhesion to polyolefin resins and which further has superior compatibility with polar resins used for coating purposes, as well as high solution stability, and a process for producing the same.

Further objects and characteristics of the present invention will become apparent from the following description.

The present inventors conducted extensive research and found that an acrylic-modified chlorinated polyolefin with improved compatibility and solution stability is obtained by linking a hydroxyl-group-containing (meth)acrylic ester to an acid-modified chlorinated polyolefin via an ester linkage, thereby introducing a C=C double bond into the acid-modified chlorinated polyolefin, and then graft-copolymerizing (meth)acrylic acid monomers with the polyolefin. The present invention was accomplished based on this finding.

The present invention therefore provides a coating composition for polyolefin resins and a process for producing the same, which are defined below.

1. A coating composition for polyolefin resins, comprising a resin obtained by graft-copolymerizing at least one member selected from the group consisting of an α,β-unsaturated carboxylic acid and an acid anhydride thereof with at least one member selected from the group consisting of polypropylene and a propylene-α-olefin copolymer, chlorinating the graft copolymer to give an acid-modified chlorinated polyolefin, linking a (meth)acrylic ester having one hydroxyl group to the polyolefin via an ester linkage, and then graft-copolymerizing (meth)acrylic acid monomers with the polyolefin.

2. The composition according to item 1, wherein 0.1 to 10 weight % of at least one member selected from the group consisting of an α,β-unsaturated carboxylic acid and an acid anhydride thereof is graft-copolymerized with at least one member selected from the group consisting of polypropylene and a propylene-α-olefin copolymer.

3. The composition according to item 1 or 2, wherein the chlorine content of the acid-modified chlorinated polyolefin is 16 to 35 weight %.

4. The composition according to any one of items 1 to 3, wherein the weight ratio of the acid-modified chlorinated polyolefin to the (meth)acrylic acid monomers is 50:50 to 10:90.

5. The composition according to any one of items 1 to 4, wherein the (meth)acrylic acid monomers include cyclohexyl (meth)acrylate in an amount of 20 to 80 weight %.

6. A process for producing a coating composition for polyolefin resins, comprising graft-copolymerizing at least one member selected from the group consisting of an α,β-unsaturated carboxylic acid and an acid anhydride thereof with at least one member selected from the group consisting of polypropylene and a propylene-α-olefin copolymer, chlorinating the graft copolymer to give an acid-modified chlorinated polyolefin, heating the polyolefin to convert carboxyl groups into an acid anhydride group, linking the acid anhydride group with the hydroxyl group of a hydroxyl-group-containing (meth)acrylic ester via an ester linkage, and then graft-copolymerizing (meth)acrylic acid monomers with the polyolefin.

In the present invention, "(meth)acrylic acid" represents "acrylic acid or methacrylic acid", "(meth)acrylic ester" represents "acrylic ester or methacrylic ester", and "cyclohexyl (meth)acrylate" represents "cyclohexyl acrylate or cyclohexyl methacrylate".

In order to produce the coating composition for polyolefin resins of the present invention, an acid-modified polyolefin (A) is first obtained by graft-copolymerizing at least one member selected from the group consisting of an α,β-unsaturated carboxylic acid and an acid anhydride thereof with at least one member selected from the group consisting of polypropylene and a propylene-α-olefin copolymer.

The polypropylene or propylene-α-olefin copolymer for use in the invention may be either crystalline or amorphous. The propylene-α-olefin copolymer is one obtained by copolymerizing an α-olefin with propylene, with the propylene being the main component. Examples of α-olefins include ethylene, 1-butene, 1-heptene, 1-octene, and 4-methyl-1-pentene. These compounds may be used either singly or in combination of two or more species. The ratio of ratio of propylene components to the α-olefin components in the propylene-α-olefin copolymer is not particularly limited. It is, however, preferable that the proportion of the propylene components to the copolymer be 50 mole % or higher.

The α,β-unsaturated carboxylic acid or acid anhydride thereof to be graft-copolymerized with the polypropylene or propylene-α-olefin copolymer in the present invention is, for example, maleic acid, itaconic acid or citraconic acid, or acid anhydride of such an acid, with acid anhydrides being preferable, and maleic anhydride and itaconic anhydride being more preferable. The amount of the graft-copolymerized α,β-unsaturated carboxylic acid or acid anhydride thereof is preferably 0.1 to 10 weight %, and more preferably 1 to 5 weight %.

The method for graft-copolymerizing the α,β-unsaturated carboxylic acid or acid anhydride thereof with the polypropylene or propylene-α-olefin copolymer may be a conventionally employed method, such as a solution or melting method.

The solution method may be performed, for example, as follows: The polypropylene or propylene-α-olefin copolymer is dissolved in an aromatic organic solvent, such as toluene, at a temperature of 100 to 180° C., and to the solution is then added the α,β-unsaturated carboxylic acid or acid anhydride thereof. Subsequently, organic peroxide with high hydrogen abstraction ability is added either in one step or in portions as a radical generating agent, thereby initiating reaction. The reaction mixture is then injected into a ketone solvent, such as acetone, to thereby collect the resin. The resin thus obtained is dried, yielding an acid-modified polyolefin (A).

The melting method may be performed, for example, as follows: The polypropylene or propylene-α-olefin copolymer is melted by heating it to the melting point or above, and to the melt is added the α,β-unsaturated carboxylic acid or acid anhydride thereof. Organic peroxide is then added as a radical generating agent, thus initiating reaction. After completion of the reaction, the unreacted components of the α,β-unsaturated carboxylic acid or acid anhydride thereof are removed by reducing the pressure while maintaining the molten state, whereby an acid-modified polyolefin (A) is obtained. The melting method uses a kneader, extruder or the like.

Examples of organic peroxides used as radical generating agents include benzoyl peroxide, dicumyl peroxide, and di-t-butyl peroxide. A suitable selection may be made depending on the reaction temperature and decomposition temperature.

Thereafter, the acid-modified polyolefin (A) thus obtained is chlorinated, whereby an acid-modified chlorinated polyolefin (B) is formed.

The above chlorination may be accomplished by, for example, dissolving the acid-modified polyolefin (A) in a chlorinated solvent, and then blowing chlorine gas into the solution in the presence or absence of a radical catalyst so that the chlorine content of the acid-modified chlorinated polyolefin is 16 to 35 weight %. Examples of chlorinated solvents include tetrachloroethylene, tetrachloroethane, carbon tetrachloride, and chloroform. The temperature for the dissolution and reaction is preferably equal to or higher than the temperature at which the acid-modified polyolefin (A) dissolves in the chlorinated solvent.

The acid-modified polyolefin (A), which is obtained by acid modification of the polypropylene or propylene-α-olefin copolymer, has two carboxyl groups when the acid component used for the modification is an α,β-unsaturated carboxylic acid, and has an acid anhydride group when the acid component used for the acid modification is an acid anhydride of an α,β-unsaturated carboxylic acid. The acid anhydride group, however, readily undergoes a ring-opening reaction by absorbing moisture from the air, solvent, etc., and therefore, after a period of time, tends to take the form of two carboxyl groups in the acid-modified chlorinated polyolefin (B).

For this reason, it is preferable that, before reacting the acid-modified chlorinated polyolefin (B) with a hydroxyl-group-containing (meth)acrylic ester, such two carboxyl groups be converted into an acid anhydride group by, for example, dissolving or dispersing the acid-modified chlorinated polyolefin (B) in an organic solvent and then heating the solution or mixture to cause dehydration. The acid anhydride group, which is the result of converting the two carboxyl groups through the ring-closing reaction as described above, is thereafter esterified by reacting with a (meth)acrylic ester having one hydroxyl group, thus introducing a C=C double bond into the acid-modified chlorinated polyolefin (B).

An ester linkage between a carboxyl group and a hydroxyl group may be formed by the use of an esterification catalyst. This catalyst, however, may remain in the final product, leading to deterioration in coating film properties. It is, therefore, preferable to form beforehand an acid anhydride group, which is more easily esterified with a hydroxyl group, and then link the acid anhydride group to the hydroxyl group of the hydroxyl-group-containing (meth)acrylic ester via an ester linkage.

Examples of solvents to be used in the above reaction include benzene, toluene, xylene, cyclohexane, methylcyclohexane, methyl ethyl ketone, methyl isobutyl ketone, ethyl acetate, tetrahydrofuran, propylene glycols, etc. These solvents can be used either singly or in combination of two or more species. Considering the fact that heating is required to form an acid anhydride group in advance, it is preferable that the selection be made from the solvents having a boiling point of 120° C. or higher, or that the heating be performed under pressure in a pressurizable container. It is also preferable that the heating be performed at a temperature of about 110 to 135° C. for about 30 minutes to 2 hours.

Examples of hydroxyl-group-containing (meth)acrylic esters for use in the esterification include 2-hydroxyethyl acrylate, 2-hydroxypropyl acrylate, polypropylene glycol acrylate, 2-hydroxyethyl methacrylate, 2-hydroxypropyl methacrylate, polypropylene glycol methacrylate, and like (meth)acrylic esters having one hydroxyl group. The use of a (meth)acrylic ester having two or more hydroxyl groups is not preferred because it causes cross-linking to take place during the esterification, thus promoting gelation.

In the subsequent step, (meth)acrylic acid monomers are graft-copolymerized with the acid-modified chlorinated polyolefin into which a C=C double bond has been introduced by the esterification as described above, whereby an acrylic-modified chlorinated polyolefin (C) is obtained.

This graft copolymerization may be achieved by either heating the acid-modified chlorinated polyolefin having the C=C double bond incorporated therein to the melting point or above, or dissolving the polyolefin in an organic solvent so that reaction can occur, and may use the same approach and apparatus as those used for the case of graft-copolymerizing at least one member selected from the group consisting of an α,β-unsaturated carboxylic acid and an acid anhydride thereof, which was described earlier.

The graft copolymerization is preferably performed such that the weight ratio of the acid-modified chlorinated polyolefin to the (meth)acrylic acid monomers is 50:50 to 10:90. In other words, it is preferable that 50 to 90 weight % of the (meth)acrylic acid monomers be graft-copolymerized. An amount of less than 50 weight % is likely to deteriorate compatibility with polar resins used as coating materials, such as polyurethane resins or polyester resins, while an amount of more than 90 weight % is likely to deteriorate compatibility with other chlorinated polyolefin resins used as compatibilizing agents.

The graft copolymerization may be performed by, for example, subsequent to linking the (meth)acrylic ester having one hydroxyl group to the acid-modified chlorinated polyolefin via an ester linkage to thereby introduce a C=C double bond into the polyolefin, dropping a mixture of the (meth)acrylic acid monomers and a radical generating agent into the reaction mixture, i.e., the solution of acid-modified chlorinated polyolefin with a C=C double bond introduced therein, while maintaining the temperature of the solution.

Examples of (meth)acrylic acid monomers to be graft-copolymerized include (meth)acrylic acids and (meth) acrylic esters. Specific examples of (meth)acrylic esters include methyl acrylate, ethyl acrylate, propyl acrylate, n-butyl acrylate, isobutyl acrylate, t-butyl acrylate, 2-ethylhexyl acrylate, lauryl acrylate, stearyl acrylate, 2-hydroxyethyl acrylate, 2-hydroxypropyl acrylate, cyclohexyl acrylate, polypropylene glycol acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, 2-hydroxyethyl methacrylate, 2-hydroxypropyl methacrylate, cyclohexyl methacrylate, polypropylene glycol methacrylate, etc.

It is preferable, from the standpoint of the solution stability of the desired composition, that the (meth)acrylic acid monomers to be graft-copolymerized include cyclohexyl (meth)acrylate in an amount of 20 to 80 weight %. If the amount of the cyclohexyl (meth)acrylate is less than 20 weight %, the desired composition tends to have reduced solution stability, resulting in a separation into two layers, whereas if the amount of the cyclohexyl (meth)acrylate is more than 80 weight %, the compatibility of the desired composition with polyurethane coating materials, etc., tends to be impaired, resulting in deterioration in coating film properties.

Examples of radical generating agents include organic peroxides, such as benzoyl peroxide or t-butyl peroxy-2-ethyl hexanoate, and azo compounds, such as azobisisobutyronitrile or dimethyl 2,2-azobisisobutyrate.

Pigments may be added and mixed into the composition of the present invention. Examples of such pigments include inorganic pigments, such as carbon black, titanium dioxide, talc, zinc oxide or aluminum paste, as well as organic pigments, such as azo pigments. The resultant resin composition solution is uniform at practical concentrations, and thus forms an even and transparent coating when cast on a film, etc., meaning that a coating film with high gloss can be obtained even when it is used as a coating material for single-layer finish.

The coating composition for polyolefin resins according to the present invention has excellent solution stability, and has superior adhesion to polyolefin resins, as with prior chlorinated polyolefin, as well as providing compatibility or excellent adhesion with polar resins used as coating materials.

More specifically, the coating composition for polyolefin resins according to the present invention has superior adhesion to polyolefin resins, as well as providing high compatibility with the resins used as primer or topcoat materials for coating the surfaces of polyolefin resins, such as polypropylene.

Additionally, the coating composition for polyolefin resins according to the present invention has improved solubility in organic solvents, allowing an increase in resin content within a coating material, and thus indicating the possible development of high-solid content coating materials.

BEST MODE FOR CARRYING OUT THE INVENTION

The present invention will be described below in more detail with reference to examples, to which, however, the invention is not limited.

PRODUCTION EXAMPLE 1

Isotactic polypropylene (50.0 g, Mw=about 45,000), 3.5 g of maleic anhydride (manufactured by NOF CORPORATION), 1.0 g of dicumyl peroxide (manufactured by NOF CORPORATION), and 75.0 g of toluene were injected into an autoclave equipped with a stirrer, and then sealed therein. After allowing 5 minutes in which the atmosphere in the autoclave was replaced with nitrogen, the above compounds were reacted for 5 hours by heating and stirring at a temperature of 140° C. Upon completion of the reaction, the reaction mixture was injected into an excess of methyl ethyl ketone, thereby precipitating the resin. This resin was collected, washed several times with methyl ethyl ketone, and then dried, whereby an acid-modified polyolefin (Mw=40,000, 2 weight % added acid) was obtained. This acid-modified polyolefin (50.0 g) and 450.0 g of tetrachloroethylene were loaded into a four-necked flask equipped with a condensor, thermometer and stirrer, and then subjected to processes of heating, stirring and dissolution. Once it was confirmed that the acid-modified polyolefin had dissolved at a temperature of 110° C., 0.5 g of di-t-butyl peroxide was injected, followed by injection of 31.3 g of chlorine gas. Thereafter, the tetrachloroethylene was replaced as a solvent by xylene, whereby an acid-modified chlorinated polyolefin (22.1 weight % chlorine content, 1.4 weight % added acid) was obtained.

PRODUCTION EXAMPLE 2

An acid-modified chlorinated polyolefin (Mw=100,000, 21.2 weight % of chlorine content, 1.6 weight % added acid) was obtained by conducting graft copolymerization with maleic anhydride and chlorination in the same manner as in Production Example 1, except that a crystalline propylene-ethylene copolymer (Mw=400,000, 7 mole % ethylene content) was used in place of isotactic polypropylene.

PRODUCTION EXAMPLE 3

An acid-modified chlorinated polyolefin (Mw=35,000, 16.5 weight % chlorine content, 2.0 weight % added acid) was obtained by performing graft copolymerization with maleic anhydride and chlorination in the same manner as in Production Example 1, except that a non-crystalline propylene-butene copolymer (Mw=40,000, 30 mole % butene content) was used in place of isotactic polypropylene.

EXAMPLE 1

In a four-necked flask equipped with a stirrer, condensor, thermometer and dropping funnel, 15 weight parts of the acid-modified chlorinated polyolefin obtained in Production Example 1 was dissolved in 45 weight parts of xylene, followed by heating at a temperature of 120° C. for 1 hour. Thereafter, 2 weight parts of 2-hydroxyethyl acrylate was added into the flask, the contents of which were then continuously stirred to facilitate esterification. Subsequently, into this was dropped over a period of 3 hours a solution in which 30 weight parts of cyclohexyl methacrylate, 30 weight parts of methyl methacrylate, 20 weight parts of lauryl methacrylate, 3 weight parts of methacrylic acid, 105 weight parts of xylene and 1.7 weight parts of t-butyl peroxy-2-ethyl hexanoate were mixed well, and thereafter the reaction was continued for 5 hours with sufficient stirring, followed by cooling.

The resin concentration of the solution thus obtained was 40 weight %, and the viscosity of the solution was 1,200 mPa·s at a temperature of 23° C. The weight-average molecular weight of the resin was 40,000.

EXAMPLE 2

A resin solution was obtained by performing esterification and graft copolymerization in the same manner as in Example 1, except that the acid-modified chlorinated polyolefin obtained in Production Example 2 was used in place of the acid-modified chlorinated polyolefin obtained in Production Example 1.

EXAMPLE 3

A resin solution was obtained by performing esterification and graft copolymerization in the same manner as in Example 1, except that the acid-modified chlorinated polyolefin obtained in Production Example 3 was used in place of the acid-modified chlorinated polyolefin obtained in Production Example 1.

EXAMPLE 4

A resin solution was obtained by performing esterification and graft copolymerization in the same manner as in Example 1, except that polypropylene glycol methacrylate was used as a hydroxyl-group-containing (meth)acrylic ester in place of 2-hydroxyethyl acrylate.

COMPARATIVE EXAMPLE 1

A resin solution was obtained in the same manner as in Example 1, except that 2-hydroxyethyl acrylate was not added in advance of the other (meth)acrylic acid monomers, but added concurrently.

The resin solutions obtained in Examples 1 to 4 and Comparative Example 1 were evaluated for film transparency, solution stability, and compatibility with acrylic resins in accordance with the methods described below, the results of which are shown in Table 1.

Evaluation Methods

Film transparency: Each resin solution was applied to a glass plate using a 50-μm-type applicator, and then dried for 30 minutes at a temperature of 80° C. The film thus obtained was examined for transparency.

Solution stability: Each resin solution was left standing at room temperature for one month, and its state was then checked.

Compatibility with acrylic resins: Each resin solution was blended with acrylic polyol (trade name "ACRYDIC A800", manufactured by DAINIPPON INK AND CHEMICALS, INCORPORATED) in a resin ratio of 1:1. The mixture was applied to a glass plate using a 50-μm-type applicator, and then dried for 30 minutes at a temperature of 80° C. The film thus obtained was examined for transparency.

TABLE 1

|  | Examples | | | | Comparative Example |
|---|---|---|---|---|---|
|  | 1 | 2 | 3 | 4 | 1 |
| Resin of Production Example 1 | 15 | — | — | 15 | 15 |
| Resin of Production Example 2 | — | 15 | — | — | — |
| Resin of Production Example 3 | — | — | 15 | — | — |
| Esterification reaction | Yes | Yes | Yes | Yes | No |
| HEA | 2 | 2 | 2 | — | 2 |
| PGMA | — | — | — | 2 | — |
| CHMA | 30 | 30 | 30 | 30 | 30 |
| MMA | 30 | 30 | 30 | 30 | 30 |
| LMA | 20 | 20 | 20 | 20 | 20 |
| MAA | 3 | 3 | 3 | 3 | 3 |
| Film transparency | Transparent | Transparent | Transparent | Transparent | Separation occurred |
| Solution stability | No Separation occurred | No Separation occurred | No Separation occurred | No Separation occurred | Separation occurred |
| Compatibility with acrylic resins | Compatible | Compatible | Compatible | Compatible | — |

The abbreviations used in Table 1 represent the following: HEA=2-hydroxyethyl acrylate, PGMA=polypropylene glycol methacrylate, CHMA=cyclohexyl methacrylate, MMA=methyl methacrylate, LMA=lauryl methacrylate, and MAA=methacrylic acid.

EXAMPLE 5

Xylene was added to the acrylic-modified chlorinated polyolefin solution obtained in Example 1 to give a xylene solution with a resin content of 20 weight %. Titanium oxide (2 weight %) was added to the xylene solution, and the mixture was then sufficiently stirred and dispersed with a homogenizer, thereby preparing a primer. Thereafter, a base material made of polypropylene was spray-coated with the primer, on which was then applied a silver-colored basecoat material and subsequently a two-pack urethane clear coating, followed by baking at a temperature of 100° C. for 30 minutes, and then standing at room temperature for 4 days, whereby a coating piece (3 clb) was obtained.

COMPARATIVE EXAMPLE 2

A coating piece (3 clb) was obtained in the same manner as in Example 5, except that the resin solution obtained in Comparative Example 1 was used in place of the acrylic-modified chlorinated polyolefin solution obtained in Example 1.

EXAMPLE 6

The acrylic-modified chlorinated polyolefin solution obtained in Example 1 was mixed with an acrylic polyol solution (trade name "DESMOPHEN A365", manufactured by Bayer AG) to give a resin ratio of 1:1. After adding 2 weight % of titanium oxide, the mixture was thoroughly stirred and dispersed using a homogenizer. After adding polyisocyanate (trade name "DESMODUR N3390", manufactured by Bayer AG), the mixture was again stirred well, thereby giving a coating material for single-layer finish. This coating material was spray-applied to a base material made of polypropylene, followed by baking at a temperature of 80° C. for 30 minutes and then standing at room temperature for 4 days, whereby a coating piece (1clb) was obtained.

COMPARATIVE EXAMPLE 3

A coating piece (1clb) was obtained in the same manner as in Example 6, except that the resin solution obtained in Comparative Example 1 was used in place of the acrylic-modified chlorinated polyolefin solution obtained in Example 1.

The coating pieces obtained in Examples 5 and 6 and Comparative Examples 2 and 3 were evaluated for adhesion in accordance with the method described below, the results of which are shown in Table 2.

Evaluation Method

The surface of each coating piece was cross-cut into 25 cells with a spacing of 2 mm, which were then subjected to peeling at an angle of 180 degrees with a tape manufactured by NICHIBAN.

TABLE 2

|  | Example 5 | Comparative Example 2 | Example 6 | Comparative Example 3 |
|---|---|---|---|---|
| Acrylic-modified | Example 1 | Comparative Example 1 | Example 1 | Comparative Example 1 |

TABLE 2-continued

|  | Example 5 | Comparative Example 2 | Example 6 | Comparative Example 3 |
|---|---|---|---|---|
| chlorinated polyolefin |  |  |  |  |
| Interlayer adhesion of 3c1b coating piece | No delamination occurred | Interlayer delamination occurred | — | — |
| Adhesion of 1c1b coating piece | — | — | No delamination occurred | Delamination occurred |

The abbreviations used in Table 2 represent the following:
3c1b = a method which involves applying a primer, a basecoat material and a topcoat material and thereafter baking once, and
1c1b = a method which involves applying a coating material and thereafter baking once.

What is claimed is:

1. A coating composition for polyolefin resins, comprising a resin obtained by graft-copolymerizing at least one member selected from the group consisting of an α,β-unsaturated carboxylic acid and an acid anhydride thereof with at least one member selected from the group consisting of polypropylene and a propylene-α-olefin copolymer, chlorinating the graft copolymer to give an acid-modified chlorinated polyolefin, heating the polyolefin to convert carboxyl groups into an acid anhydride group, linking the acid anhydride group with the hydroxyl group of a hydroxyl-group-containing (meth)acrylic ester via an ester linkage, and then graft-copolymerizing (meth)acrylic acid monomers with the polyolefin.

2. The composition according to claim 1, wherein 0.1 to 10 weight % of at least one member selected from the group consisting of an α,β-unsaturated carboxylic acid and an acid anhydride thereof is graft-copolymerized with at least one member selected from the group consisting of polypropylene and a propylene-α-olefin copolymer.

3. The composition according to claim 1, wherein the chlorine content of the acid-modified chlorinated polyolefin is 16 to 35 weight %.

4. The composition according to claim 2, wherein the chlorine content of the acid-modified chlorinated polyolefin is 16 to 35 weight %.

5. The composition according to claim 1, wherein the weight ratio of the acid-modified chlorinated polyolefin to the (meth)acrylic acid monomers is 50:50 to 10:90.

6. The composition according to claim 2, wherein the weight ratio of the acid-modified chlorinated polyolefin to the (meth)acrylic acid monomers is 50:50 to 10:90.

7. The composition according to claim 3, wherein the weight ratio of the acid-modified chlorinated polyolefin to the (meth)acrylic acid monomers is 50:50 to 10:90.

8. The composition according to claim 4, wherein the weight ratio of the acid-modified chlorinated polyolefin to the (meth)acrylic acid monomers is 50:50 to 10:90.

9. The composition according to claim 1, wherein the (meth)acrylic acid monomers include cyclohexyl (meth)acrylate in an amount of 20 to 80 weight %.

10. The composition according to claim 2, wherein the (meth)acrylic acid monomers include cyclohexyl (meth)acrylate in an amount of 20 to 80 weight %.

11. The composition according to claim 3, wherein the (meth)acrylic acid monomers include cyclohexyl (meth)acrylate in an amount of 20 to 80 weight %.

12. The composition according to claim 4, wherein the (meth)acrylic acid monomers include cyclohexyl (meth)acrylate in an amount of 20 to 80 weight %.

13. The composition according to claim 5, wherein the (meth)acrylic acid monomers include cyclohexyl (meth) acrylate in an amount of 20 to 80 weight %.

14. The composition according to claim 6, wherein the (meth)acrylic acid monomers include cyclohexyl (meth) acrylate in an amount of 20 to 80 weight %.

15. The composition according to claim 7, wherein the (meth)acrylic acid monomers include cyclohexyl (meth) acrylate in an amount of 20 to 80 weight %.

16. The composition according to claim 8, wherein the (meth)acrylic acid monomers include cyclohexyl (meth) acrylate in an amount of 20 to 80 weight %.

17. A process for producing a coating composition for polyolefin resins, comprising graft-copolymerizing at least one member selected from the group consisting of an α,β-unsaturated carboxylic acid and an acid anhydride thereof with at least one member selected from the group consisting of polypropylene and a propylene-α-olefin copolymer, chlorinating the graft copolymer to give an acid-modified chlorinated polyolefin, heating the polyolefin to convert carboxyl groups into an acid anhydride group, linking the acid anhydride group with the hydroxyl group of a hydroxyl-group-containing (meth)acrylic ester via an ester linkage, and then graft-copolymerizing (meth)acrylic acid monomers with the polyolefin.

\* \* \* \* \*

UNITED STATES PATENT AND TRADEMARK OFFICE
CERTIFICATE OF CORRECTION

PATENT NO. : 6,861,471 B2 Page 1 of 1
APPLICATION NO. : 10/474356
DATED : March 1, 2005
INVENTOR(S) : Takafumi Masuda et al.

It is certified that error appears in the above-identified patent and that said Letters Patent is hereby corrected as shown below:

Cover page, item (86) after "§371 (c)(1), (2), (4) Date:", "Oct. 7, 2003" should be --Oct. 9, 2003--.

Signed and Sealed this

Twenty-sixth Day of May, 2009

JOHN DOLL
*Acting Director of the United States Patent and Trademark Office*